United States Patent
Leroux et al.

(10) Patent No.: US 10,020,910 B2
(45) Date of Patent: Jul. 10, 2018

(54) SYSTEMS, DEVICES AND METHODS FOR NETWORK COMMUNICATION

(71) Applicant: HUAWEI TECHNOLOGIES CO., LTD., Shenzhen (CN)

(72) Inventors: Philippe Leroux, Vanier (CA); Aaron Callard, Ottawa (CA); Nimal Gamini Senarath, Ottawa (CA); Alex Stephenne, Stittsville (CA)

(73) Assignee: HUAWEI TECHNOLOGIES., LTD., Shenzhen, Guangdong (CN)

( * ) Notice: Subject to any disclaimer, the term of this patent is extended or adjusted under 35 U.S.C. 154(b) by 82 days.

(21) Appl. No.: 14/610,543

(22) Filed: Jan. 30, 2015

(65) Prior Publication Data
US 2016/0227419 A1 Aug. 4, 2016

(51) Int. Cl.
*H04W 24/02* (2009.01)
*H04L 1/00* (2006.01)
*H04L 1/18* (2006.01)
*H04L 1/16* (2006.01)

(52) U.S. Cl.
CPC .......... *H04L 1/0003* (2013.01); *H04L 1/1671* (2013.01); *H04L 1/1896* (2013.01); *H04L 2001/0093* (2013.01); *H04L 2001/0097* (2013.01)

(58) Field of Classification Search
None
See application file for complete search history.

(56) References Cited

U.S. PATENT DOCUMENTS

| | | | | |
|---|---|---|---|---|
| 8,599,782 | B2* | 12/2013 | Chung | H04L 1/1812 370/315 |
| 9,237,546 | B1* | 1/2016 | Zhang | H04W 64/00 |
| 2009/0175214 | A1* | 7/2009 | Sfar | H04B 7/15592 370/315 |
| 2009/0196240 | A1* | 8/2009 | Frederiksen | H04L 1/1607 370/329 |
| 2009/0225876 | A1* | 9/2009 | Sung | H04L 1/0045 375/260 |

(Continued)

FOREIGN PATENT DOCUMENTS

| | | |
|---|---|---|
| CN | 101048001 A | 10/2007 |
| CN | 101933276 A | 12/2010 |
| CN | 103181108 A | 6/2013 |

OTHER PUBLICATIONS

English Abstract of CN101048001 (A).
(Continued)

*Primary Examiner* — Jay P Patel
(74) *Attorney, Agent, or Firm* — Norton Rose Fulbright Canada LLP

(57) ABSTRACT

Systems, devices and methods for link level communication between a user equipment and plurality of network devices are described. A user equipment can include at least one processor configured to: after broadcasting a first data message to the plurality of base stations, receive one or more acknowledgements, corresponding to the first data message, from at least one of the plurality of base stations; and upon receipt of at least one acknowledgement, broadcast an indicator to the plurality of base stations, the indicator providing an indication of at least one of the at least one received acknowledgement.

22 Claims, 5 Drawing Sheets

(56) References Cited

U.S. PATENT DOCUMENTS

| | | |
|---|---|---|
| 2009/0247150 A1* | 10/2009 | Fischer ................. H04W 24/10 455/425 |
| 2009/0262678 A1 | 10/2009 | Oyman et al. |
| 2009/0285145 A1 | 11/2009 | Youn et al. |
| 2010/0061475 A1* | 3/2010 | Mo ....................... H04L 1/1867 375/261 |
| 2010/0205500 A1* | 8/2010 | Lee ....................... H04L 1/1685 714/748 |
| 2010/0254369 A1 | 10/2010 | Tao et al. |
| 2010/0309840 A1* | 12/2010 | Umesh .................. H04L 1/0083 370/328 |
| 2010/0315989 A1* | 12/2010 | Reznik ............... H04B 7/15557 370/315 |
| 2011/0194485 A1* | 8/2011 | Horneman .......... H04W 72/042 370/315 |
| 2011/0223924 A1* | 9/2011 | Lohr ................... H04W 72/042 455/450 |
| 2011/0268059 A1* | 11/2011 | Li ......................... H04L 1/1812 370/329 |
| 2011/0300854 A1* | 12/2011 | Shan .................... H04L 1/1887 455/422.1 |
| 2011/0305213 A1* | 12/2011 | Lohr .................... H04L 1/1887 370/329 |
| 2012/0002611 A1 | 1/2012 | You et al. |
| 2012/0026935 A1* | 2/2012 | Park ...................... H04L 1/1854 370/315 |
| 2012/0087334 A1* | 4/2012 | Suzuki .................... H04L 5/001 370/329 |
| 2012/0176887 A1 | 7/2012 | Mcbeathi et al. |
| 2012/0289170 A1 | 11/2012 | Li et al. |
| 2013/0272291 A1 | 10/2013 | Mukherjee et al. |
| 2013/0315115 A1 | 11/2013 | Kim et al. |
| 2014/0018116 A1 | 1/2014 | Novak et al. |
| 2014/0140273 A1* | 5/2014 | Kim ...................... H04L 1/1812 370/328 |
| 2014/0226577 A1* | 8/2014 | Lee ....................... H04W 24/08 370/329 |
| 2015/0023267 A1* | 1/2015 | Lim ...................... H04L 1/1854 370/329 |
| 2015/0071264 A1 | 3/2015 | Yang et al. |
| 2015/0124670 A1* | 5/2015 | Park ...................... H04L 1/1671 370/281 |
| 2015/0207607 A1 | 7/2015 | Tang et al. |
| 2015/0222408 A1* | 8/2015 | Yerramalli ............ H04L 5/0055 370/228 |
| 2015/0296059 A1* | 10/2015 | Karri .................... H04L 69/324 370/329 |
| 2015/0312007 A1* | 10/2015 | Yang .................... H04L 1/1854 370/329 |
| 2015/0351153 A1* | 12/2015 | Ramkumar ............. H04L 1/188 370/329 |
| 2016/0095137 A1* | 3/2016 | Chen .................... H04L 5/0007 370/329 |
| 2016/0205703 A1* | 7/2016 | Dudda .................. H04W 72/04 455/452.1 |
| 2017/0237546 A1* | 8/2017 | Yang ......................... H04L 5/14 370/280 |

OTHER PUBLICATIONS

Abstract of US2015207607 (A1) corresponding to CN103181108 (A).

Abstract of US2015071264 (A1) corresponding to CN101933276 (A).

Zhu, Yanfeng et al., "A Multi-AP Architecture for High-Density WLANs: Protocol Design and Experimental Evaluation", Sensor, Mesh and Ad Hoc Communications and Networks, 2008. SECON '08. 5th Annual IEEE Communications Society Conference on Jun. 16, 2008.

IEEE Std 802.16j-2009, IEEE Standard for Local and metropolitan area networks, Part 16: Air Interface for Broadband Wireless Access Systems, Jun. 12, 2009.

Sheu, S.T., Presentation: "Multihop HARQ in WiMAX Network with Relays", Dec. 26, 2007.

* cited by examiner

SYSTEMS, DEVICES AND METHODS FOR NETWORK COMMUNICATION

FIELD

This disclosure relates to network communications, and more particularly, to systems, devices, and methods for link level communications.

BACKGROUND

With the growth of communication networks, joint scheduling and data cooperation between multiple base stations have been used for interference coordination. Additional or alternative approaches for coordinating networks may be realized.

SUMMARY

In accordance with one aspect, there is provided a user equipment configured for link level communication with a plurality of base stations. The user equipment can include at least one processor configured to: after broadcasting a first data message to the plurality of base stations, receive one or more acknowledgements, corresponding to the first data message, from at least one of the plurality of base stations; and upon receipt of at least one acknowledgement, broadcast an indicator to the plurality of base stations, the indicator providing an indication of at least one of the at least one received acknowledgement.

In some examples, when at least one positive acknowledgement is received, the indicator can be a new data indicator included in a second message.

In some examples, indicator can be a feedback message broadcast to the plurality of base stations upon receipt of the at least one acknowledgement.

In some examples, upon receipt of a grant, the at least one processor can be configured to broadcast grant information to the plurality of base stations.

In accordance with another aspect, there is provided a base station configured for link level communication with a user equipment. The base station can include at least one processor configured to: upon receiving at least a portion of a broadcasted first data message from the user equipment, sending an acknowledgement to the user equipment, the acknowledgement including an identifier associated with the base station.

In some examples, when the base station identifies a restriction on routing the first data message upstream or otherwise determines that the first data message cannot be successfully routed upstream, the at least one processor can be configured to send a negative backhaul acknowledgement to the user equipment.

In some examples, when the base station receives grant information from the user equipment, the at least one processor can configure the base station to decode data from the user equipment using the grant information irrespective of whether the base station has been assigned to the user equipment.

In accordance with another aspect, there is provided a method for link level communication between a user equipment and a plurality of base stations. The method can include: after broadcasting a first data message to the plurality of base stations, receiving one or more acknowledgements, corresponding to the first data message, from at least one of the plurality of base stations; and upon receipt of at least one acknowledgement, broadcasting an indicator to the plurality of base stations, the indicator providing an indication of at least one of the at least one received acknowledgement.

In accordance with another aspect, there is provided a method for link level communication between a base station and a user equipment. The method can include: upon receiving at the base station at least a portion of a broadcasted first data message from the user equipment, sending an acknowledgement to the user equipment, the acknowledgement including an identifier associated with the base station.

In accordance with another aspect, there is provided a controller for managing link-level communications between a user equipment and a plurality of base stations. The controller includes at least one processor configured to: receive feedback message information from at least one of the plurality of base stations, and generate or adjust grants based on the feedback message information.

Many further features and combinations thereof concerning the present improvements will appear to those skilled in the art following a reading of the instant disclosure.

DESCRIPTION OF THE FIGURES

In the figures.

These drawings depict aspects of example embodiments for illustrative purposes, and variations, alternative configurations, alternative components and modifications may be made to these example embodiments.

DETAILED DESCRIPTION

Figure 1:
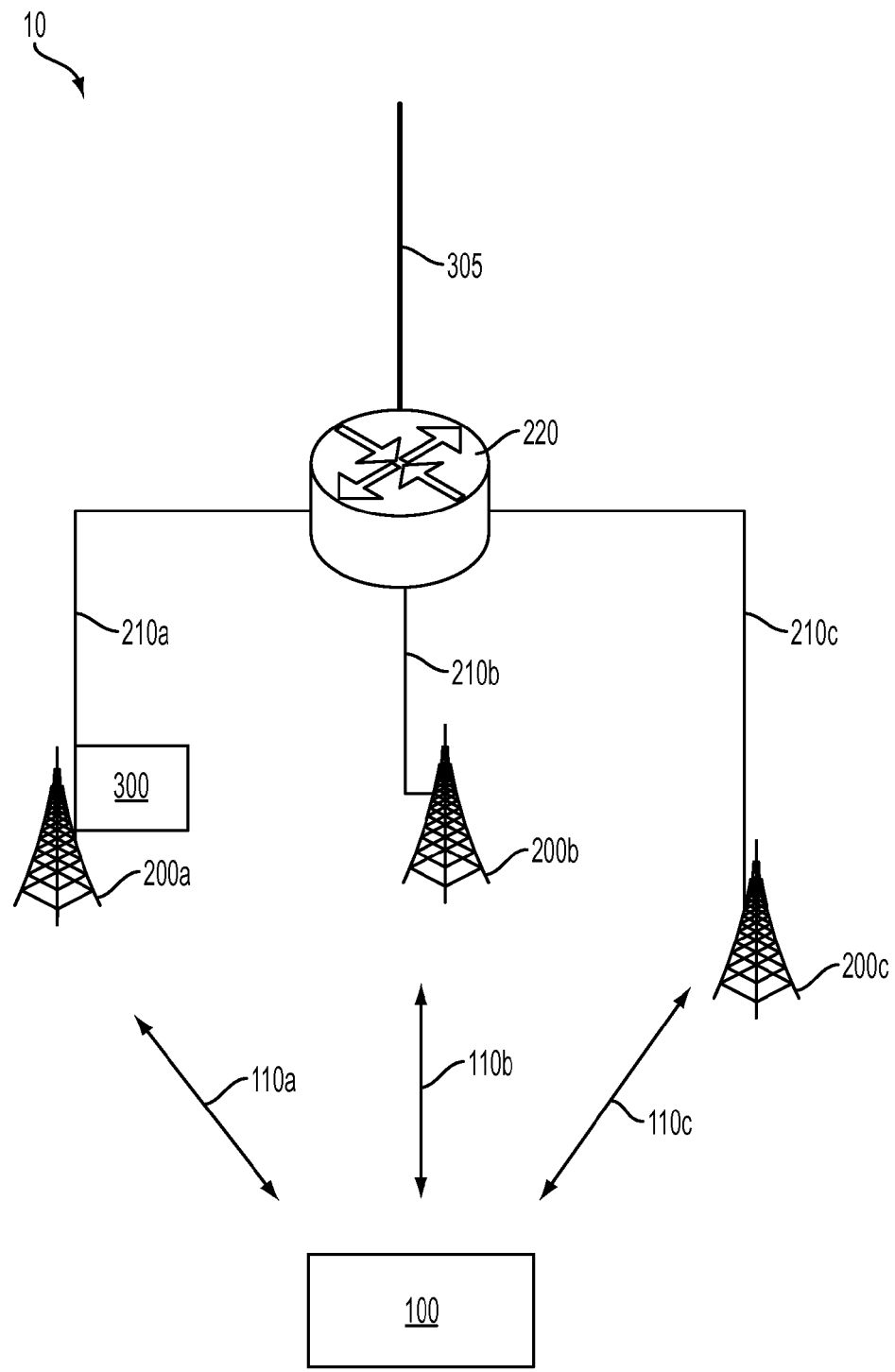
FIG. 1 is a network diagram of an example network communication system.

FIG. 1 illustrates aspects of an example network communication system 10 to which aspects of the present disclosure can be applied. The network communication system 10 can include any number of network devices 200a, 200b, 200c, communicably connected with a network node 220 via respective backhaul networks 210a, 210b, 210c. The network node 220 can be connected to a core network or other network(s) 305. A controller 300 is illustrated at a network device 200a, but in other example embodiments, can be located in the backhaul network(s) 210, the core network(s) 305, at other network device(s) 200, at the network node 220, or elsewhere in the system 10. In some examples, the controller and/or its implementation may be distributed across multiple components of the system 10. In some examples, there may be multiple controllers in the system 10.

Communication device 100 may be any device configured for communication with one or more network device(s) 200. For example, the communication device 100 may be a user equipment (UE) or end user device including, but not limited to, a wireless transmit/receive unit, mobile station, fixed or mobile subscriber unit, laptop, personal computer (PC), pager, personal digital assistant (PDA), tablet, touchpad, e-reader, smart phone, cellular phone, sensor (wireless or otherwise), meter or other data collection device/instrument, consumer electronics device, imaging device, gaming device, set top box or the like. In some embodiments, the communication device 100 may be a network node such as a router, switch, hub, access point and the like.

The communication device 100 may have a network interface in order to communicate with other components, to access and connect to network resources, to serve an application and other applications, and/or perform other computing applications by connecting to a network (or multiple networks), capable of carrying data. It should be understood that although a single communication device 100 is illustrated for sake of simplicity, the system 10 may include any number of communication devices 100.

The network device(s) 200 may be any communication device configured for communication with one or more communication device(s) 100. The network device(s) 200 may be configured to facilitate access to one or more communication networks, such as the Internet. Illustratively, each network device 200 can be a base station (BS) that may include (or be) one or more several network devices, such as a base transceiver station (BTS), a Node-B (NodeB), an evolved NodeB (eNodeB), a Home NodeB, a Home eNodeB, a site controller, an access point (AP), and/or a wireless router. While the network devices 200*a*, 200*b*, 200*c* are each depicted as a single element, it should be understood that the network devices may include any number of interconnected base stations and/or network elements. In some examples, the network device(s) 200 may be devices at the edge of the network, or may be intermediate network devices or nodes.

The communication device(s) 100 and the network device(s) 200 may communicate over an air or other interface 110*a,b,c* which may be any suitable wireless communication link, including but not limited to radio frequency (RF), microwave, infrared (IR), ultraviolet (UV), visible light, or the like. The air interface may be established using any suitable radio access technology and the communications system 100 may be a multiple access system employing one or more channel access schemes, such as CDMA, TDMA, FDMA, OFDMA, SC-FDMA, and the like. Accordingly, technologies including, but not limited to the following may be implemented by the communication device 100 and the network device(s) 200: wideband CDMA (WCDMA), High-Speed Packet Access (HSPA), Evolved HSPA (HSPA+), High-Speed Downlink Packet Access (HSDPA), High-Speed Uplink Packet Access (HSUPA), Long Term Evolution (LTE), LTE-Advanced (LTE-A), Universal Mobile Telecommunications System (UMTS) Terrestrial Radio Access (UTRA), Evolved UMTS Terrestrial Radio Access (E-UTRA), IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In another example, the interface(s) 110 between the communication device(s) 100 and network device(s) 200 may be via a network or multiple links. For example, the communication device 100 may be connected to a sub-network which can connect to the network node 220 via two or more of the communication devices 200*a*, 200*b*, etc.

While the discussion herein contemplates various wireless communication interfaces 110, in certain applications, aspects of the present disclosure may be similarly apply to wired, short range or other communication interface(s).

The network device(s) 200*a*, 200*b*, 200*c* may be connected to the network node 220 via their respective backhaul networks 210*a*, 210*b*, 210*c*. In some examples, a backhaul network 210 may be a single wired, wireless or other communication link. In some examples, a backhaul network 210 may include any number of networks, nodes and/or links for establishing a communication link with network node 220. In some examples, a backhaul network may include parts of a multi-hop or mesh network. In some examples, portions of one backhaul network 210*a* may overlap or may be otherwise shared with a second backhaul network 210*b*, 210*c*. Each backhaul network 210 may be subject to permanent and/or changing bandwidth constraints depending on network capabilities, network traffic and/or other factors.

The network node 220 can be any networking device for linking the backhaul network(s) 210 to a core or broader network. For example, the network node 220 may be a router, switch, hub, network interface controller, line card, or any other communication device.

While the system 10 of FIG. 1 shows three network device(s) 200 (and backhaul networks 210), and examples herein describe scenarios with two network device(s), the examples systems and methods can be similarly applied to any number of network device(s) and their connections with the communication device 100.

Figure 2:
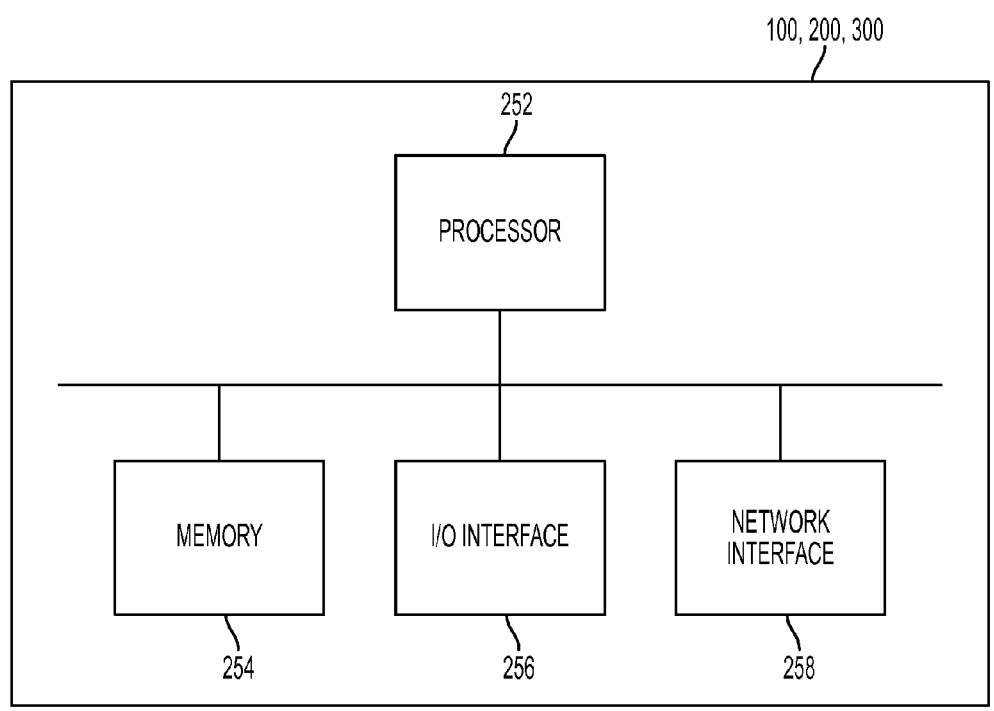
FIG. 2 is a high-level schematic diagram of an example communication device, network device and/or controller.

FIG. 2 is a schematic diagram showing aspects of an example communication device 100, network device 200 and/or controller 300. In some example embodiments, communication device(s) 100, network device 200 and/or controller 300 may include one or more processor(s) 252 connected to one or more memory(ies) 254. The processor(s) may be connected to one or more network interface(s) 258 configured to transmit and/or receive data frames through an antenna or other interface. The processor(s) and/or network interface(s) and/or other aspects of the device(s) 100, 200, 300 may include any suitable hardware structure for generating signals for wireless transmission and/or processing signals received wirelessly. A Coder-Decoder (CODEC) may also be provided and configured to encode and decode a digital data frame. The CODEC may be implemented by software programs, hardware chips including digital signal processor and buffers, or a combination of hardware and software. The CODEC may implement coding schemes for Forward Error Correction (FEC), channel security, or other purposes. In an embodiment, the CODEC may be used at a communication device 100 network device 200 and/or controller 300 to add error correction to a frame received from upper layers.

The memory(ies) 254 may be accessible by the processor(s) to access, receive and/or store data. The memory(ies) 254 may include a main memory, such as a high speed Random Access Memory (RAM), an auxiliary storage unit, such as a hard disk, flash memory, and/or a magnetic tape drive. The memory(ies) 254 may include any other type of memory, such as a Read-Only Memory (ROM), Erasable Programmable Read-Only Memory (EPROM), electrically-erasable programmable read-only memory (EEPROM), Ferroelectric RAM (FRAM), or optical storage media such as a videodisc and a compact disc. In an embodiment, the memory may be used to buffer data and/or instructions. The processor(s) may access the memory(ies) to retrieve data or instructions. The processor(s) 252 may be any device that can perform operations on data. Examples include a central processing unit (CPU), a front-end processor, a microprocessor, a field programmable gate array (FPGA), a reconfigurable processor, a digital signal processor, a network processor, an integrated circuit, or any other processing device and/or any combination thereof. Applications may be running on the processor and may be configured to perform various tasks including at least aspects of the methods described herein.

The device(s) 100, 200, 300 may include input/output devices and/or input/output interface(s) 256 for input/output devices such as built-in or peripheral devices such as displays, touchscreens, keyboards, sensors, input mechanisms, actuators and the like.

The system 10 and its various components may be configured to communicate using different communication protocol(s) and/or protocol stacks. In general, the communications and methods described herein can be directed to protocol(s) and/or communication(s) below the TCP/IP level. For example, embodiments of the present disclosure may be directed to link level, layer 2, Radio Link Control (RLC) layer, Medium Access Control (MAC) layer, Radio Resource Control (RRC) layer and/or other lower level communications.

In some examples, link level communications can be used to control the usage of error correction, concatenation, segmentation, re-segmentation, duplicate detection, and in-sequence delivery of units of data and has functions of protocol error detection, recovery, and data unit discarding. Link level communications may be used for grant information, data messages and/or acknowledgements (such as an ACK, NACK, or Backhaul-NACK).

It should be understood that, although the term "data unit" or "packet" is often used in higher protocol layers to refer to data bits while the term "transport block" (TB) is sometimes used in lower layers, the terms frame, packet, transport block, message and data unit are used interchangeably herein to designate data bits which are delimited with a clear start and an end in the physical layer or higher layers.

With reference to FIG. 1, during uplink communications, the communication device 100 may transmit data via any number of communication device(s) 200. When multiple communication device(s) 200 are involved such as in a multipoint or cooperative MIMO (multiple-input multiple-output) system, various factors may be considered such as efficiency, redundancy, coordination, throughput, traffic balancing, quality of service (QoS) and/or any other considerations.

In some example scenarios, depending on environmental conditions, device capabilities, and relative locations of the communication device 100 and the network devices 200, link quality and bandwidth between the communication device 100 and each network device 200*a*, 200*b*, 200*c* may vary. Similarly, the backhaul networks 210*a*, 210*b*, 210*c* may also have varying levels of throughput, link quality, etc. based on device capabilities, traffic volumes, link quality, and other factors which may change over time. In some examples the backhaul networks may include or may be part of ultra-dense or multihop networks which may be subject to varying network conditions.

In some examples, aspects of the present disclosure may provide mechanism(s) for communicating multipoint traffic and/or network information.

Figure 3:
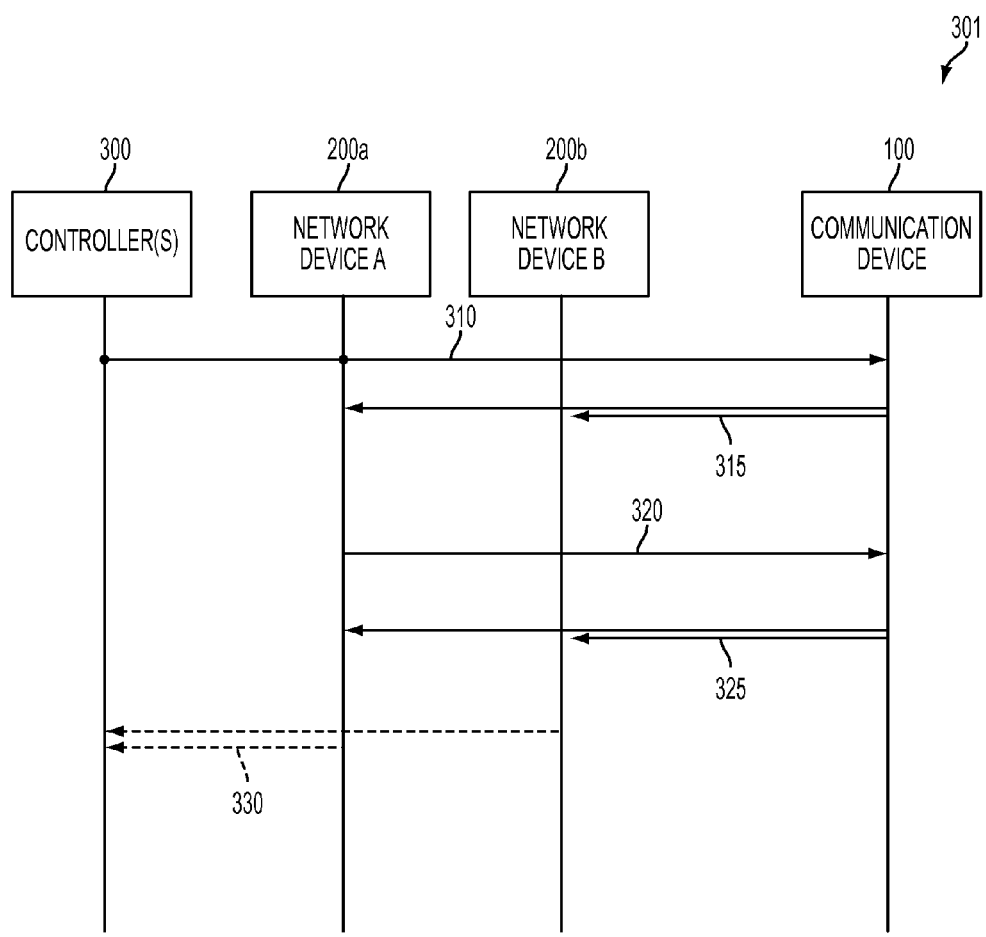
FIGS. 3-5 are flowcharts showing example communications in an example system.

FIG. 3 shows a flowchart 301 of example communications which can occur during link level communication between a communication device 100 and a plurality of network devices 200*a*, 200*b*, etc. In some examples, such communications may be used for uplink data communication.

At 310, the communication device 100 can receive a grant from the controller 300 via network device A 200*a*. The grant may, in some examples, include information regarding resources assigned to the communication device 100.

At 315, the communication device 100 can be configured to broadcast a first data message to a plurality of network devices. In some examples, the first data message can include grant information required for a network device 200 to decode data in the first data message. While in the example shown in FIG. 3, the first data message is broadcasted to network device A 200*a* and network device B 200*b*, in some example embodiments, the communication device 100 can be configured to broadcast the first data message to any number of network devices including, in some examples, network devices which were not specifically assigned in the grant. In some examples, the communication device's first data message broadcast may be transmitted to any network device 200 within its communication range.

At 320, network device A 200*a*, upon receiving at least a portion of the first data message from the communication device, can be configured to send an acknowledgement to the communication device. In some examples, the acknowledgement can be a control or data message representing or including a positive, negative, backhaul or other acknowledgement indicator or message. The acknowledgement and/or its type (positive, negative, etc.) can, in some examples, be a bit, flag, character or other bit stream in a message or header. It should be understood that reference to a negative acknowledgement can include a negative acknowledgement, a negative backhaul acknowledgement or both.

In some examples, the acknowledgement can include an identifier associated with receiving network device A 200*a*. The identifier may be one or more character(s), number(s), pattern(s) and/or bit(s) associated with a network device which can be used to distinguish it from other network devices. In some examples, the identifier can be unique across all network devices such as a MAC address, IP address or other unique identifier. In some examples, the identifier may be unique only between network devices within a cell or within a defined proximity or range of each other.

In some examples, the identifier may be unique only between network devices assigned to or otherwise in potential communication with the communication device. For example, identifiers may be assigned and/or communicated to each communication device 200 in conjunction with a grant from the controller 300 or otherwise. For example, if three or four network devices are associated with a communication device, each network device may be assigned a two-bit code (i.e. 00, 01, 10, 11). In some examples, identifiers may be assigned and/or communicated dynamically based on grant and/or acquired acknowledgement information.

In some embodiments, the use of simplified identifiers may reduce the number of bits required to communicate acknowledgement information which may, in some examples, improve bandwidth usage and/or reduce processing/storage requirements.

When network device A 200*a* can successfully decode the first data message, network device A 200*a* can, at 320, be configured to send a positive acknowledgement, such as an ACK, to the communication device 100.

When the network device A 200*a* is unable to decode or does not receive the entire first data message, network device A 200*a* can, at 320, be configured to send a negative acknowledgement, such as a NACK or NAK, to the communication device 100.

In some examples, once properly decoded, the network device A 200*a* can be configured to route the first data message upstream to the network node 220 via the backhaul network 210*a*. In some scenarios, the network device A 200*a* may determine that the first data message cannot be successfully routed upstream or may otherwise identify a restriction on routing the first data message upstream. In some examples, this determination can be based on a message or indication that a link in the backhaul network 210a is down, a message or indication that the network node 220 is unreachable, a message or indication that a buffer is full, or any other signal or reason that the first data message cannot be successfully routed upstream.

In some examples, the network device A 200a may be configured to determine that the first data message cannot be successfully routed upstream or identify a restriction on routing the first data message upstream when a QoS associated with the first data message cannot be satisfied. For example, if a first data message is associated with a QoS requiring no delay and the network device A is unable to forward the first data message immediately, the network device A can determine that it cannot successfully route the message upstream. In other examples, the network device A may be configured to determine that the first data message cannot be successfully routed upstream or identify a restriction on routing the first data message upstream if it cannot meet a timing threshold or if one or more buffer capacities indicate that the first data message cannot be forwarded in a manner which would satisfy the QoS requirements.

When the network device determines that the first data message cannot be routed upstream or otherwise identifies a restriction on routing the first data message upstream, the network device can be configured to send a NACK, and/or a backhaul-NACK. A backhaul-NACK can, in some examples, be a different indicator than a NACK and may provide an indication to the communication device that the negative acknowledge was caused by backhaul issue(s) and not because the network device was unable to decode the message.

Upon receiving at least one acknowledgement (of any kind), the communication device 100 can, at 325, be configured to broadcast an indicator to all or any number of network devices 200 to provide to the network devices 200 an indication of the acknowledgement.

For example, in FIG. 3, if at 320, the communication device 100 receives a positive acknowledgement from network device A, the communication device, at 325, can be configured to broadcast an indicator that a positive acknowledgement was received. In some example scenarios, receipt of a single positive acknowledgement associated with the first data message from any network device 200 can inform the communication device 100 that the first data message was properly received, decoded and/or forwarded. With this information, the communication device 100 can be configured to communicate an indication of the positive acknowledgement to all network device(s) 200. In some examples, upon receipt of a single positive acknowledgement, the communication device 100 can be configured to stop sending data, retransmitting data or responding to retransmit requests from other network device(s) with respect to the first data message.

In some examples, a network device can be configured to send a positive acknowledgement and/or a positive backhaul acknowledgement (when data is successfully forwarded), separately or combined. In some example embodiments, a positive acknowledgement may indicate proper receipt and decoding; or it may indicate proper receipt, decoding and forwarding of the data message.

In some example embodiments, the indicator can be a new data indicator included in a second message broadcast to the network devices 200. In such examples, the receiving network device(s) can be configured to assume that for any subsequent message including a new data indicator, the previous message (i.e. the first data message) was properly decoded and/or forwarded to the network node. Upon receipt of such an indicator in a second broadcasted message, in some examples, the network device(s) (e.g. network device B) can be configured to stop processing or to purge any associated data or portion of the first data message. In some examples, the broadcasting of the indicator can prevent or reduce duplicates of the first data message from being forwarded to the network node thereby reducing backhaul load or congestion.

In some example embodiments, the indicator broadcasted by the communication device at 325 can comprise or can be a part of a feedback message. The feedback message can be a control or other message which includes an indication of the at least one acknowledgement. In some examples, a feedback message may be a standalone message, or it may be part of a subsequent data or other message. For example, in FIG. 3, if at 320, the communication device 100 receives a positive acknowledgement from network device A, the communication device, at 325, can be configured to broadcast a feedback message including information indicating that a positive acknowledgement was received. Upon receipt of such a feedback message, in some examples, the network device(s) (e.g. network device B) can be configured to stop processing, store or to purge any associated data or portion of the first data message. In some example scenarios, the broadcasting of the indicator can prevent or reduce duplicates of the first data message from being forwarded to the network node by the different network devices 200 thereby reducing backhaul load or congestion. In some examples, a network device 200 which was unsuccessful in receiving and/or decoding the first data message and receives a feedback message indicating that another device has properly decoded and/or forwarded the first data message can be configured to stop, prevent or otherwise not send any requests for retransmissions (e.g. ARQ or HARQ transmissions). This may, in some scenarios, reduce traffic between the communication device 100 and the network device(s) 200.

In some example embodiments, the indicator/feedback message may not include any identifier associated with the network device 200 that sent the acknowledgement (at 320). In some such embodiments, the network device 200 that sent the acknowledgement may be configured to automatically route the first data message upstream, and may disregard the subsequent indicator/feedback message from the communication device 100. Upon receipt of the indicator/feedback message, any other network device 200, which was unsuccessful or did not completely receive and/or decode the first data message, can be configured to stop, prevent or otherwise not send any requests for retransmissions (e.g. ARQ or HARQ transmissions) because the received indicator/feedback message implies that another network device 200 successfully received/decoded the first data message.

In some example embodiments, the indicator/feedback message broadcasted by the communication device 100 (at 325) may include an identifier associated with the network device 200 from which the acknowledgement was sent (at 320). In some example embodiments, at 330, one or more of the network device(s) 200 which received the indicator/feedback message broadcasted by the communication device 100 can communicate the indicator/feedback information to the controller(s) 300.

In the example embodiments and scenarios described with respect to FIG. 3, the communication device 100 may play a greater role in the control of uplink traffic management in the system 10. In some examples, by collecting and forwarding acknowledgements to all network device(s) in the system 10, the communication device 100 may in some situations increase information available to the controller(s) 300 for traffic management and grant decisions. For example, in some scenarios, the acknowledgements may provide loads, conditions, attributes or other information relating to the interfaces 110, backhaul networks 210, network devices 200 and/or communication device(s) 100. In some example situations, the collection and forwarding of acknowledgements can reduce the management burden and/or control communications of the controller(s) 300. For example, in some situations as described herein, the network device(s) may be able to determine which network device should forward data and/or can determine whether to ACK or request retransmission without feedback or instruction from the controller. In some embodiments, by collecting and forwarding acknowledgements, the communication device 100 can determine and/or control if and when it can send new data, which in some example scenarios may relieve or reduce the controller's responsibility of this process.

Figure 4:
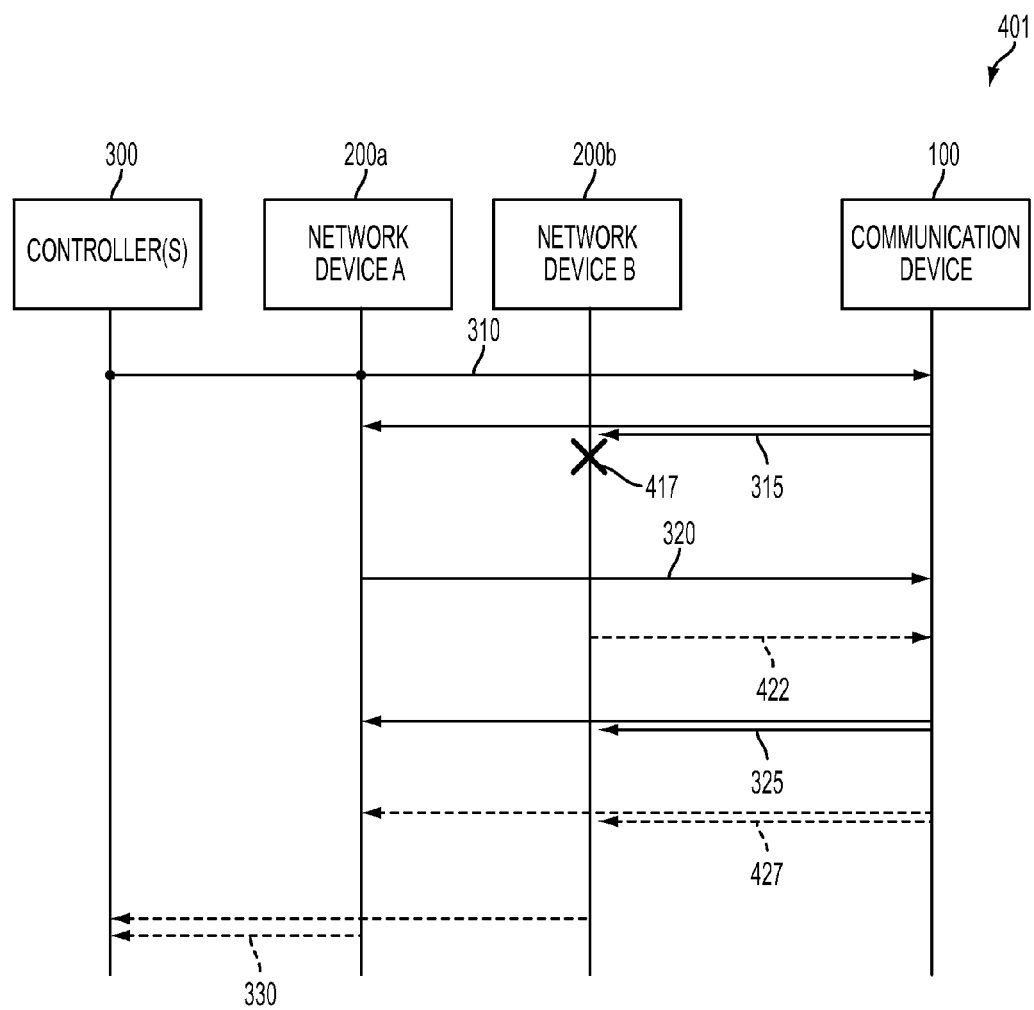

FIG. 4 shows another flowchart 401 of example communications which can occur during link level communication between a communication device 100 and a plurality of network devices 200a, 200b, etc. In some examples, such communications may be used for uplink data communication.

In this example, after the communication device 100 broadcasts the first data message at 315, network device B 200b receives a portion of the broadcasted first data message but, at 417, is unable to decode or does not receive the entire message. At 325, when network device B 200b receives from the communication device a feedback message including an indication that a positive acknowledgement was received and an identifier that is not associated with network device B (e.g. an identifier corresponding to network device A or another device, or an identifier unrecognizable to network device B), network device B can be configured to stop, prevent or otherwise not send any requests for retransmissions (e.g. ARQ or HARQ transmissions) for the first data message, and/or may be configured to stop processing, store or to purge any associated data or portion of the first data message.

In some example embodiments, when network device B 200b is unable to decode or does not receive the entire first data message, network device B 200b can, at 422, be configured to send a negative acknowledgement to the communication device 100. At 427, communication device 100 may be configured to broadcast a feedback message indicating the negative acknowledgement and including an identifier associated with network device B 200b. In some examples, the communication device 100 may broadcast multiple feedback messages in separate messages (as illustrated in FIG. 4, 325, 427), or may broadcast a single feedback message which includes indications and/or identifiers for multiple acknowledgements received by the communication device.

In another example scenario, network device B 200b may, at 417, have properly received and decoded the first data message, but may be unable to route the first data message upstream due to one or more backhaul constraints or conditions, and will send a negative or negative-backhaul acknowledgement. In some examples, the network device may be configured to send this negative acknowledgement when the network node 220 or another destination is unreachable, when the network node 220 does not properly receive the message, when the size of the message will require a throughput rate which is higher than the maximum or the currently available rate, when the network device's buffer is full or exceeds a threshold, etc. Upon receipt of a negative backhaul acknowledgement from network device B 200b at 422, the communication device 100 can, at 427 be configured to broadcast a feedback message to the base stations including an indication of the negative backhaul acknowledgement. In some examples, the feedback message can include an identifier associated with network device B.

In some examples, when a negative backhaul acknowledgement is received from an identified network device (e.g. network device B), the communication device 100 can be configured to adjust a modulation and coding scheme (MCS) or schedule for the communication device. For example, a negative backhaul acknowledgement may provide an indication (or in some example, may explicitly include data indicating) that network device B and/or its backhaul is currently unable to process, buffer and/or forward the amount of data it is receiving. In response, in some example embodiments, the communication device 100 can be configured to adjust its communications and/or grant with the identified network device to reduce the amount and/or rate of data it transmits with the identified network device.

Similarly, in some examples, network device(s) can be configured to use received (historical or otherwise) feedback message information to adjust an MCS or schedule for communications with the communication device. For example, a network device may be configured to increase the amount and/or rate of data it can receive from the communication device if it receives multiple positive feedback messages including an identifier associated with itself. In another example, the network device may be configured to increase the amount and/or rate of data it can receive from the communication device if it receives one or more negative feedback messages including an identifier associated with a different network device.

In some example embodiments, network device(s) can be configured to use received feedback message information to determine whether the network device should forward its copy of the first data message upstream (e.g. to the network node). For example, at 427, upon receipt of the negative feedback message including an identifier not associated with network device A 200a (i.e. the identifier associated with network device B 200b), network device A 200a will know that another network device was unsuccessful in receiving/decoding the first data message, so network device A 200a can be configured to route its copy of the first data message upstream.

In some example embodiments, the communication device 100 can be configured to broadcast indicators and/or feedback messages for every acknowledgement it receives. This can, in some scenarios provide the greatest amount of network information to the network devices 200 and/or controller(s) 300 which may be used to aid in current or future data communications/grants, load balancing, avoidance, etc.

Figure 5:
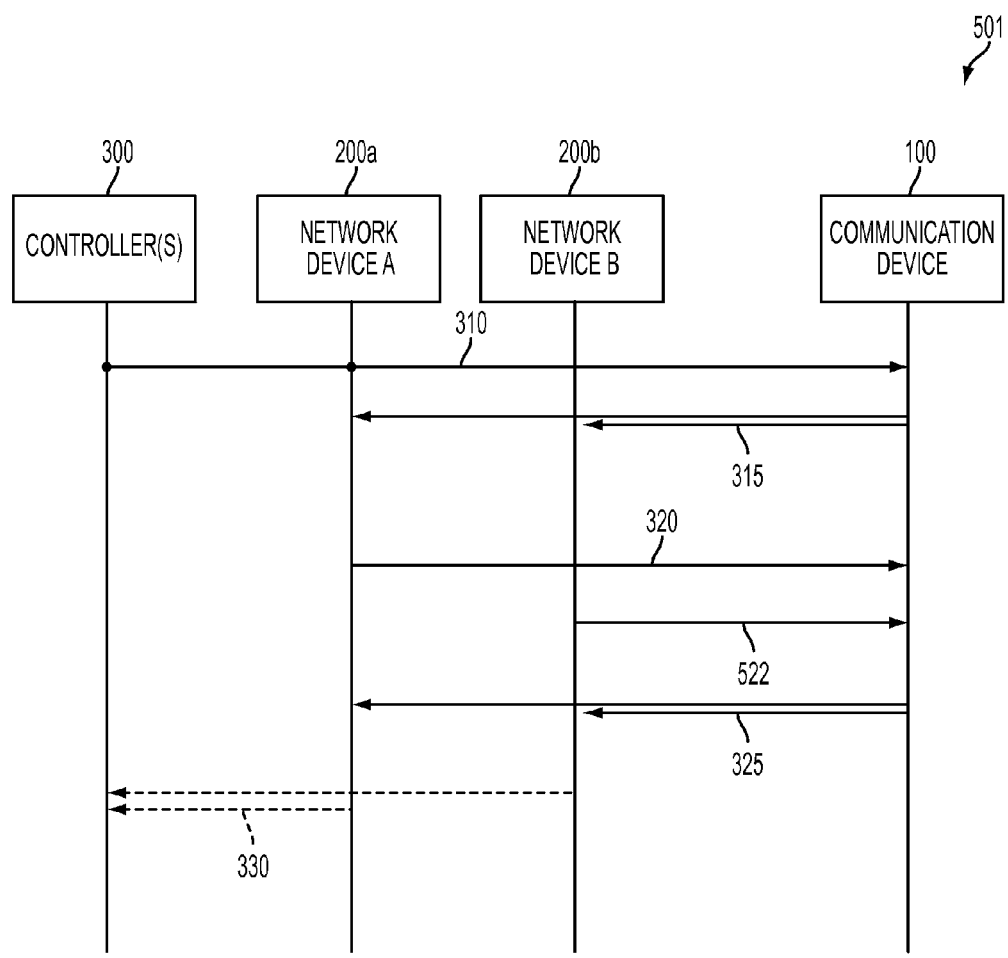

In other embodiments, the communication device 100 may be configured to be selective in its broadcasting of feedback messages. In some situations, this may provide increased traffic/network control to the communication device 100 and may decrease or simplify the processes required of the controller(s). As an illustrative example, FIG. 5 shows a flowchart 501 of example communications where both network device A 200a and network device B 200b are, at 315, able to receive and decode the first data message.

In response, both network device A (at 320) and network device B (at 522) send positive acknowledgements to communication device 100. Upon receipt of multiple positive acknowledgements, in some example embodiments, communication device 100 can be configured to broadcast a single feedback message including a single identifier associated with one of the network devices from which the positive acknowledgements were received. The communication device 100 can be configured to select this identifier based on various criteria. For example, in some embodiments, the communication device 100 may be configured to select the identifier included in the feedback message based on a round-robin, random or other algorithm.

In some embodiments, the communication device 100 may be configured to select the identifier based on positive or negative acknowledgements received from the communication devices for previous messages. For example, if the communication device recently received one or more negative (backhaul or otherwise) acknowledgements from network device B, the communication device 100 may be configured to select the identifier associated with network device A. In this manner, the communication device may, in some scenarios, be able to control what network information is shared with the network devices 200 and/or controller(s) 300.

In some embodiments, the network devices may be configured to route data messages upstream only upon receipt of a feedback message. For example, at 325 in FIG. 5, network device A, network device A can be configured to forward the first data message upstream upon receiving the broadcast feedback message including an identifier corresponding to itself. Conversely, network device B, which receives the broadcast feedback message including the identifier which does not correspond to itself, can be configured to purge, store for backup or otherwise stop processing the first data message.

In another embodiment, the network devices may be configured to route portions of the first data message upstream based on the feedback message. For example, based on a shared or common rule set or algorithm between the network devices, upon receipt of a positive feedback message including an identifier associated with network device A, network device A can be configured to forward the first 50% or 75% of the first data message upstream, and network device B can be configured to forward the second 50% or 25% of the first data message upstream. Any other variations or combinations can be used for any number of network devices.

Similarly, in example embodiments where all acknowledgements received by the communication device are broadcasted in feedback messages (combined or individually), in situations when multiple positive acknowledgements have been received, the network devices may be configured to route portions or all of the first data message upstream based on a shared or common rule set or algorithm between the network devices. For example, in the scenario in FIG. 5, upon receipt of positive feedback message(s) including identifiers associated with network devices A and B, network device A may be configured to forward a first data message and network device B may be configured to forward a second data message; or network device A may be configured to forward a defined first portion of a first data message, and network device B may be configured to forward a defined second portion of the first data message. In some examples, the common rule set(s)/algorithm(s) may determine load sharing based on information associated with the first data message. For example, network device A may be configured to forward data for data messages having even identifiers, and network device B may be configured to forward data for data messages having odd identifiers. In some examples, rules may be based on hashes, mods, timestamps, error correction codes, or any other information associated with the data message. Any other variations or combinations may be used for any number of network devices.

In any of the above example communications (301, 401, 501) or otherwise, in some example embodiments, upon receipt of a grant from the controller(s) 300, the communication device 100 can be configured to broadcast the grant information to all network devices within its communication range and/or network. This grant information broadcast can, in some examples, be in conjunction with the first data message broadcast at 315 or otherwise, and can in some examples, include a new or an old data indicator.

In some examples, by broadcasting the grant information, network device(s) 200 may opportunistically try to receive, decode and/or forward the first data message irrespective if they are assigned to the communication device. In some examples, this may increase the chance that the first data message is properly decoded and forwarded and/or may ultimately increase the uplink capacity available to the communication device 100.

In any of the example embodiments described herein or otherwise, the controller(s) 300 may be configured to receive (e.g. at 330) the feedback message information from the network devices. In some examples, the controller(s) 300 may be configured to use the feedback message information for generating or adjusting current or future grants, or for other network optimizations. For example, if a positive feedback message including an identifier associated with an (opportunistic) network device not previously assigned to the communication device is received, the controller(s) may be configured to add the network device in the next grant.

In another example, if backhaul constraints exist at a particular backhaul network 210, the affected network device may be unable to directly communicate this information to the controller(s) via the backhaul. However, in some example scenarios, the controller(s) may receive this information via negative or negative-backhaul feedback message(s) received via a communication device and other network device(s). In some examples, the controller(s) can in response, avoid granting the network device with the affected backhaul, or may reduce its MCS or scheduling.

In some examples, based on a single instance or a history of the selected identifiers in positive feedback messages from a communication device, the controller(s) can be configured to increase the grants, MCS, scheduling between the network device(s) associated with the selected identifier(s) and the communication device. Conversely, the controller(s) may be configured to decrease the grants of unidentified or less frequently identified network devices, or may assign greater proportions of these network devices' timeslots to different communication devices.

In another example system 10, a plurality of devices (computer, tablet, smartphone or other user equipment) may be inter-connected within a sub-network (e.g. a home Wi-Fi network), and also connected to an LTE or other longer range wireless network. In some of these systems, one or more of the devices in the sub-network (e.g. a multi RAT home wireless router, a mobile hotspot, a tablet or other users' phone connected to both networks) may be a plurality of network devices 200a,b,c; and a base station and/or another device in the LTE network may be device 100 attempting to communicate to one or more of the first series of user end devices. In such examples, the multipoint reception coordination techniques described herein may be applied effectively in a downlink scenario.

Embodiments disclosed herein may be implemented by using hardware only or software or some combination thereof. Based on such understandings, the technical solution may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Numerous references will be made regarding servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A user equipment configured for link level communication with a plurality of network devices, the user equipment comprising:
   at least one hardware processor configured to:

after broadcasting a first data message to the plurality of network devices, receive at least one acknowledgement, corresponding to the first data message, from at least one of the plurality of network devices; and upon receipt of at least one positive acknowledgement, broadcast a feedback message to the plurality of network devices, the feedback message including at least one network device identifier identifying one or more network devices associated with the at least one received acknowledgement.

2. The user equipment of claim 1, wherein the feedback message includes a new data indicator included in a second message when the at least one positive acknowledgement is received.

3. A user equipment configured for link level communication with a plurality of network devices, the user equipment comprising:

at least one hardware processor configured to:
after broadcasting a first data message to the plurality of network devices, receive at least one acknowledgement, corresponding to the first data message, from at least one of the plurality of network devices; and
upon receipt of the at least one acknowledgement, broadcast a feedback message to the plurality of network devices, the feedback message including at least one network device identifier identifying one or more network devices associated with the at least one received acknowledgement, wherein the feedback message includes at least two identifiers each identifying one of the plurality of network devices associated with the at least one received acknowledgement.

4. The user equipment of claim 1, wherein when a plurality of positive acknowledgements are received, the at least one hardware processor is configured to select the identifier included in the feedback message from a plurality of network device identifiers associated with the network devices associated with the plurality of received positive acknowledgements.

5. The user equipment of claim 4, wherein the at least one hardware processor is configured to select the identifier based on positive or negative acknowledgements received from the plurality of network devices for previous data messages.

6. A user equipment configured for link level communication with a plurality of network devices, the user equipment comprising:

at least one hardware processor configured to:
after broadcasting a first data message to the plurality of network devices, receive at least one acknowledgement, corresponding to the first data message, from at least one of the plurality of network devices; and
upon receipt of at least one negative backhaul acknowledgement, broadcast a feedback message to the plurality of network devices, the feedback message including at least one network device identifier identifying one or more network devices associated with the at least one received acknowledgement; wherein the feedback message includes an indication of the negative backhaul acknowledgement.

7. The user equipment of claim 6, wherein when a negative backhaul acknowledgement is received from an identified network device, the at least one processor is configured to adjust a modulation and coding scheme (MCS) or schedule for the user equipment.

8. A user equipment configured for link level communication with a plurality of network devices, the user equipment comprising:

at least one hardware processor configured to:
upon receipt of a grant, broadcast grant information to the plurality of network devices;
after broadcasting a first data message to the plurality of network devices, receive at least one acknowledgement, corresponding to the first data message, from at least one of the plurality of network devices; and
upon receipt of at least one acknowledgement, broadcast a feedback message to the plurality of network devices, the feedback message including at least one network device identifier identifying one or more network devices associated with the at least one received acknowledgement.

9. The user equipment of claim 8, wherein the broadcasted grant information includes a new or old data indicator.

10. A network device configured for link level communication with a user equipment, the network device comprising:

at least one processor configured to:
upon receiving at least a portion of a broadcasted first data message from the user equipment, sending an acknowledgement to the user equipment, the acknowledgement including an identifier associated with the network device;
receive a feedback message from the user equipment, the feedback message including at least one network device identifier identifying one or more network devices associated with an acknowledgement received by the user equipment, and
process at least the portion of the first data message based on the at least one network device identifier included in the feedback message;
wherein when the network device receives, from the user equipment, a positive feedback message associated with the first data message and including a network device identifier associated with the network device, processing at least the portion of the first data message comprises routing at least the portion of the first data message upstream, or
when the network device receives, from the user equipment, a negative feedback message associated with the first data message and including a network device identifier not associated with the network device, processing at least the portion of the first data message comprises routing at least the portion of the first data message upstream.

11. The network device of claim 10, wherein when the first data message is completely received and successfully decoded, the acknowledgement is a positive acknowledgement, and when the at least portion of the first data message is not successfully decoded, the acknowledgement is a negative acknowledgement.

12. A network device configured for link level communication with a user equipment, the network device comprising:

at least one processor configured to:
upon receiving at least a portion of a broadcasted first data message from the user equipment, sending an acknowledgement to the user equipment, the acknowledgement including an identifier associated with the network device;
receive a feedback message from the user equipment, the feedback message including at least one network device identifier identifying one or more network devices associated with an acknowledgement received by the user equipment, and process at least the portion of the first data message based on the at least one network device identifier included in the feedback message;

wherein upon identifying a restriction on routing the first data message upstream, the at least one processor is configured to send a negative backhaul acknowledgement to the user equipment.

13. The network device of claim 10, wherein when the network device receives, from the user equipment, a positive feedback message associated with the first data message and including a network device identifier not associated with the network device, processing at least the portion of the first data message comprises stopping processing or purging at least the portion of the first data message.

14. A network device configured for link level communication with a user equipment, the network device comprising:
at least one processor configured to:
upon receiving at least a portion of a broadcasted first data message from the user equipment, sending an acknowledgement to the user equipment, the acknowledgement including an identifier associated with the network device;
receive a feedback message from the user equipment, the feedback message including at least one network device identifier identifying one or more network devices associated with an acknowledgement received by the user equipment, and
process at least the portion of the first data message based on the at least one network device identifier included in the feedback message;
wherein when the network device receives grant information from the user equipment, the at least one processor configures the network device to decode data from the user equipment using the grant information irrespective of whether the network device has been assigned to the user equipment.

15. The network device of claim 10, wherein the identifier associated with the network device is a simplified identifier of shorter length than a unique network device identifier, the simplified identifier assigned to the network device from a set of simplified identifiers, the set of simplifier identifiers corresponding to network devices serving the user equipment.

16. The network device of claim 10, wherein the at least one processor is configured to adjust a modulation and coding scheme (MCS) or schedule for other user equipments based on previously received feedback messages from the user equipment.

17. A network device configured for link level communication with a user equipment, the network device comprising:
at least one processor configured to:
upon receiving at least a portion of a broadcasted first data message from the user equipment, sending an acknowledgement to the user equipment, the acknowledgement including an identifier associated with the network device;
receive a feedback message from the user equipment, the feedback message including at least one network device identifier identifying one or more network devices associated with an acknowledgement received by the user equipment, and
process at least the portion of the first data message based on the at least one network device identifier included in the feedback message;
wherein when the network device receives, from the user equipment, at least a portion of a second message including a new data indicator, the at least one processor is configured to stop processing or to purge at least the portion of the first data message.

18. The network device of claim 10, wherein when the complete first data message is successfully decoded and the base station receives, from the user equipment, a feedback message associated with the first data message and including a network device identifier not associated with the network device, the at least one processor is configured to route at least a portion of the first data message upstream based on a rule set common to the network device and a network device associated with the identifier.

19. The network device of claim 10, wherein when the network device receives, from the user equipment, at least one indication of at least one acknowledgement received by the user equipment, the at least one processor is configured to communicate the at least one indication to a controller.

20. A method for link level communication between a user equipment and a plurality of network devices, the method comprising:
after broadcasting a first data message to the plurality of network devices, receiving at least one acknowledgement, corresponding to the first data message, from at least one of the plurality of network devices; and
upon receipt of at least one positive acknowledgement, broadcasting a feedback message to the plurality of network devices, the feedback message including at least one network device identifier identifying one or more network devices associated with the at least one received acknowledgement.

21. A method for link level communication between a network device and a user equipment, the method comprising:
upon receiving at the network device at least a portion of a broadcasted first data message from the user equipment, sending an acknowledgement to the user equipment, the acknowledgement including an identifier associated with the network device; and
receiving a feedback message from the user equipment, the feedback message including at least one network device identifier identifying one or more network devices associated with an acknowledgement received by the user equipment, and
processing at least the portion of the first data message based on the at least one network device identifier included in the feedback message;
wherein when the network device receives, from the user equipment, a positive feedback message associated with the first data message and including a network device identifier associated with the network device, processing at least the portion of the first data message comprises routing at least the portion of the first data message upstream, or
when the network device receives, from the user equipment, a negative feedback message associated with the first data message and including a network device identifier not associated with the network device, processing at least the portion of the first data message comprises routing at least the portion of the first data message upstream.

22. A controller for managing link-level communications between a user equipment and a plurality of network devices, the controller comprising:
at least one processor configured to: receive feedback message information from at least one of the plurality of network devices, the feedback message information including at least one network device identifier identifying one or more network devices associated with a positive acknowledgement received by the user equipment; and generate or adjust grants based on the feedback message information.

* * * * *